United States Patent [19]

Yee

[11] Patent Number: 5,171,623
[45] Date of Patent: Dec. 15, 1992

[54] DRAG REDUCING SURFACE DEPRESSIONS

[76] Inventor: Norman D. Yee, 955 14th Ave., Honolulu, Hi. 96816

[21] Appl. No.: 634,458

[22] Filed: Dec. 27, 1990

[51] Int. Cl.$^5$ .......................... B32B 3/00; B63B 1/34; B64C 1/38
[52] U.S. Cl. .................................. 428/156; 428/141; 428/212; 114/67 R; 114/288; 244/123; 244/124; 244/126; 244/130
[58] Field of Search ............... 428/167, 156, 131, 135, 428/141, 212, 172, 174; 244/123, 124, 126, 130; 114/18, 20.1, 39.1, 271, 288, 355, 67 R

[56] References Cited

U.S. PATENT DOCUMENTS

| | | | |
|---|---|---|---|
| 2,261,558 | 11/1941 | Orloff | 244/130 |
| 3,319,593 | 5/1967 | Papst | 244/130 |

*Primary Examiner*—Donald J. Loney
*Attorney, Agent, or Firm*—Richard C. Litman

[57] ABSTRACT

Fluid friction of a body moving through air or water is reduced by means of a plurality of symmetrical depressions on the surface of the body. The symmetrical depressions are closely spaced but not quite abutting. The symmetrical depressions are sized in proportion to the width of the body. For a cylindrical body, each symmetrical depression is between one fiftieth and one fortieth of the diameter of the body. The symmetrical depressions are shallow, ten to twenty times wider than they are deep. The symmetrical depressions are shaped like sections of truncated cones, or hexagonal prisms, or geodesic domes. The symmetrical depressions cover virtually the entire surface of the body.

6 Claims, 2 Drawing Sheets

DRAG REDUCING SURFACE DEPRESSIONS

FIELD OF THE INVENTION

The present invention relates to surface structures for reducing viscous fluid drag on a body moving through a fluid medium such as air or water.

DESCRIPTION OF THE PRIOR ART

Throughout history and prehistory mankind, constantly immersed within fluid media, has endeavored to move about within these fluid media. Early transporation in air was so slow that fluid friction was negligible, but early boats moving through the denser and more resistant medium of water led to the discovery of fluid friction. Today, in the supersonic age, fluid air friction against airplanes is also important. Billions of dollars are spent every year to overcome fluid friction.

Boat hulls, by trial and error, gradually evolved to have shapes which reduced friction. Today, both wind tunnels and theory are used to design low-friction bodies for airplanes and automobiles. Tanks are used for design of boats.

The shape of a body moving through a fluid influences only a part of the whole friction. The shape influences large-scale turbulence. Another kind of friction is "skin" friction, which has to do with the drag of the surface moving against the layer of fluid which is in direct contact with it.

Turbulence, which is the basis of fluid friction, was a mystery to engineers and physicists for hundreds of years. Recently, insight has been gained into turbulence with the advent of "chaos" theory, which explains how, when flow velocity reaches a certain point, vortex pairs will tend to form behind a moving body, or behind a small protrusion on a surface of such a body. Just past the point of vortex formation, the pairs are equal in size; but as speed increases, the vortexes quickly assume a number of different sizes. Finally all order is lost, and the flow is said to be "chaotic". This process is now modeled on computers. The underlying mathematics explains not only fluid friction, but also the dynamics of such diverse things as the stock market and animal populations. These new discoveries, while explaining fluid friction in part, also show that the processes involved are difficult to understand, and the present state of the art is not likely to be the final state.

The conventional wisdom in fluid skin friction has been that a very smooth skin is the best for low drag. However, this idea is based upon the difference between a smooth skin and a randomly rough skin, and upon observations such as, that a boat goes faster without barnacles on its bottom. However, the smooth skin theory ignores the evidence found in nature, where shallow periodic structures are often found on the skin of animals who must have low friction to move quickly and thus survive.

For example, fishes almost universally are covered with scales which, at their trailing edges, present a repeating pattern of ridges to the flowing water. Birds, too, have feathers which are not smooth, but rather a complex pattern of tiny ridges at a variety of angles to the flow.

Nature often exhibits engineering feats that are far beyond the technology of Man. Many of nature's engineering marvels are only now being discovered; others are still a mystery. Just one example is streamlining, which was used by animals millions of years before the wind tunnel.

Experiments have shown that a sphere moving through water has less friction if its forward surface is roughened. The small-scale turbulence induced causes less large-scale turbulence behind the sphere. This shows that smooth surfaces are not always the best. In this case, the small-scale turbulence induced by the roughness leads the fluid to "break" away from the surface in large-scale turbulence at a point farther back; the total turbulence, and so the total friction, is reduced.

Airplane wings have sometimes incorporated tiny winglets at the leading edge to generate small-scale turbulence for the same reason.

The prior art shows several attempts to incorporate non/-smooth surface patterns into a body for reducing fluid friction.

Wylie, in U.S. Pat. No. 1,364,538, shows an aircraft strut with oblong depressions. These are intended only for structural stiffening, not for aerodynamic efficiency.

Ellis, in U.S. Pat. No. 2,899,150, shows an airplane wing which incorporates parallel rows of channels along the wing for reducing friction. Each channel is in cross section a circle with a missing chord, the chord being the opening of the channel to the surface of the wing.

Papst, in U.S. Pat. No. 3,319,593, shows an airplane wing with staggered rows of slots which pass through the skin of the wing. Air is passed through the slots by a blower for boundary layer control.

Orloff, in U.S. Pat. No. 2,261,558, shows a system of rows of surface pits for reducing fluid friction. The rows run parallel to the leading edge of an airplane wing, or encircle the nose of the fuselage. The pits extend only partway back from the leading edge.

Each pit, when viewed from above, is in the streamlined shape of a teardrop. The cross section shape is shallow and rounded; the depth is 10% to 25% of the width at its widest point.

The aspect ratio of the teardrops (that is, the ratio of width to length when seen from above) varies with the curvature of the surface on which the pit is located. The greater the curvature is, the less the aspect ratio is. The ratio varies from as low as one at the leading edge of a wing to as high as 10 farther back on the wing or the fuselage.

The length of the pits is about 1% of the length of the fuselage or wing. The pits are spaced apart by 5 to 10 times the dimension of the pit.

Orloff mentions circular pits on a boat hull, which may cover the entire surface, rather than just the leading edge.

None of the above inventions and patents, taken either singly or in combination, is seen to describe the instant invention as claimed.

The prior art is not seen to disclose fluid friction reducing depressions on the surface of a moving body which are closely spaced and are sized to the size of the object.

Accordingly, one object of the present invention is to reduce fluid friction by indentations in a surface which are sized to the size of the moving body.

These and other objects of the present invention will become readily apparent upon further review of the following specification and drawings.

SUMMARY OF THE INVENTION

The present invention reduces fluid friction on a body moving through air or water. The friction is reduced by means of a plurality of depressions on the surface of the body. The depressions are closely spaced but not quite abutting.

The drag-reducing depressions are sized in proportion to the width of the body. For a cylindrical body, each depression is between one fiftieth and one fortieth of the diameter of the body. The depressions are shallow, ten to twenty times wider than they are deep.

The depressions are shaped like sections of truncated cones, or hexagonal prisms, or geodesic domes. The depressions cover virtually the entire surface of the body.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a multitude of shallow depressions in the skin of a body which is intended to move through a viscous fluid such as air or water.

Figure 1:
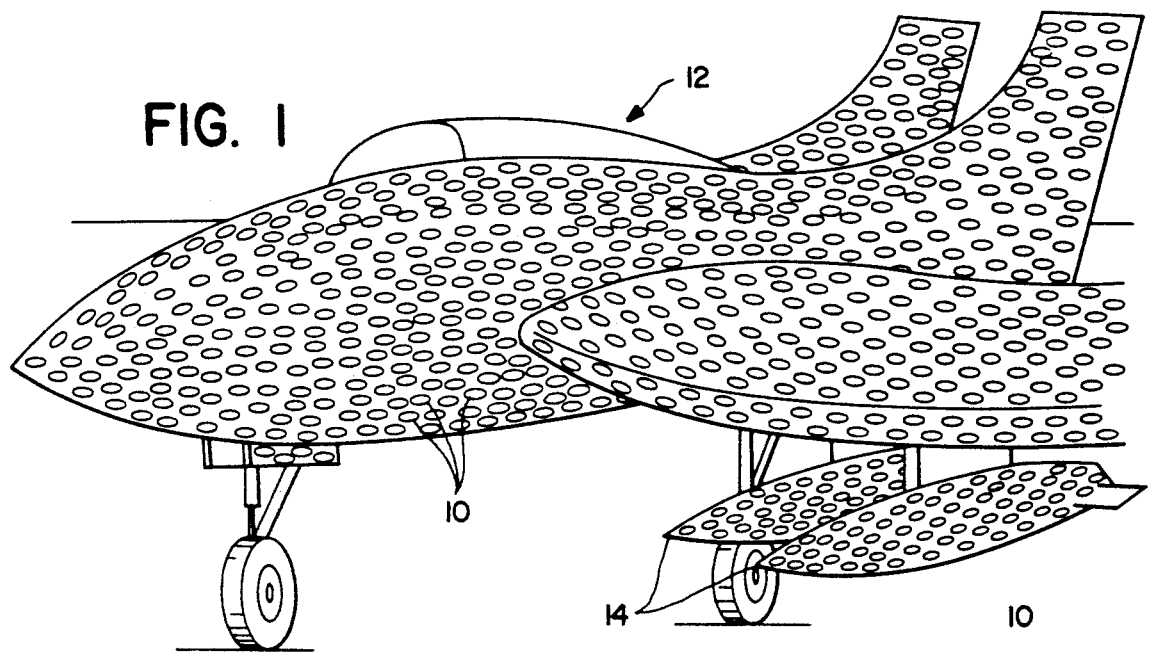
FIG. 1 is a schematic showing an airplane covered with the shallow depressions of the present invention for reduction of drag. Under the wing of the airplane are two missiles ready for launch. These missiles are also covered with depressions of a smaller size.

FIG. 1 shows an airplane 12 covered with depressions 10 over its entire surface, and two smaller missiles 14 also entirely covered with smaller depressions 10.

The depressions 10 are closely spaced, but do not abut. Just enough space is left between the depressions 10 that the original smooth surface is left intact or continuously connected. The spacing is somewhat closer than that of the dimples on a golf ball.

The dimensions of an individual depression 10 are related to the size of the moving body. This is shown in FIG. 1 where the depressions 10 on the airplane 12 are larger than the depressions 10 on the missiles 14 under the wing of the airplane.

The extent across of the depression 10, herein defined to be the greatest measurement of the depression 10 in any direction across the surface, is between one fortieth and one fiftieth of the dimension of the body transverse to the flow. (For example, if the body is cylindrical, as in the case of the guided missile 14 or airplane 12, the dimension of the body transverse to the flow is the diameter.)

Figure 2:
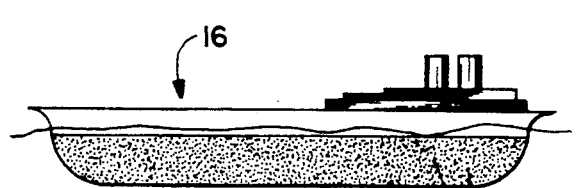
FIG. 2 is a schematic view of a boat employing the surface depressions of the instant invention below the waterline, as shown by stippling.

The depressions cover the entire surface of the body which is exposed to fluid medium motion when the body moves. FIG. 2 shows a boat 16 with a plurality of depressions covering only the part of the boat 16 below the waterline; portions of the boat 16 not wetted are smooth-surfaced. The dimension of the boat 16, for determining the size of the depressions, is the beam which, as is well known, represents the extreme width of a boat at its widest point.

Figure 3A:
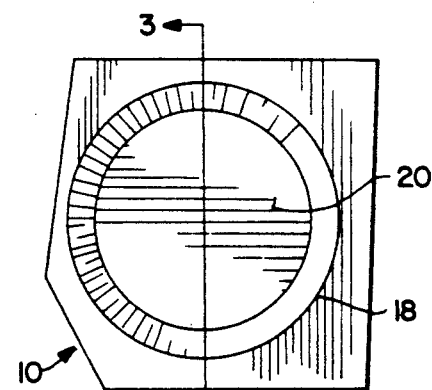
FIG. 3A is a plan view of a symmetrical depression in the shape of a frustum of a cone.
Figure 3B:
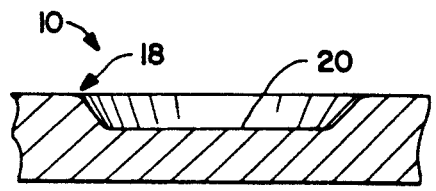
FIG. 3B is a cross sectional elevation of the same depression on the line 3—3 of FIG. 3A.

The depressions 10 are preferably round. This embodiment is seen in FIGS. 3A and 3B. FIG. 3A is a plan view and FIG. 3B is a section along the line 3—3. The depression 10 defines a three-dimensional void in the shape of a truncated cone or frustum. The base of the frustum coincides with an extension of the smooth surface; the top or smaller circle of the frustum is the bottom 20 of the depression 10. The corner 18 where the sides of the cone meet the surface is rounded.

Figure 4A:
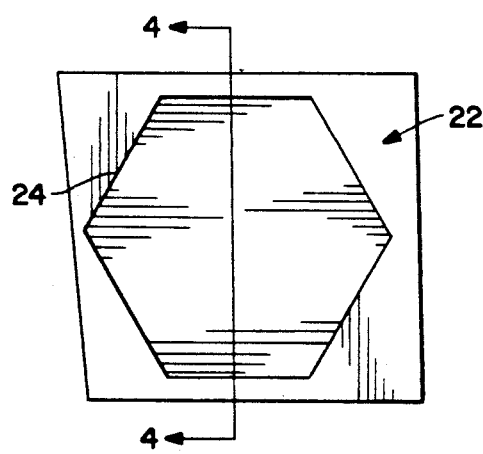
FIG. 4A is plan view of a symmetrical depression in the shape of a hexagonal prism.
Figure 4B:
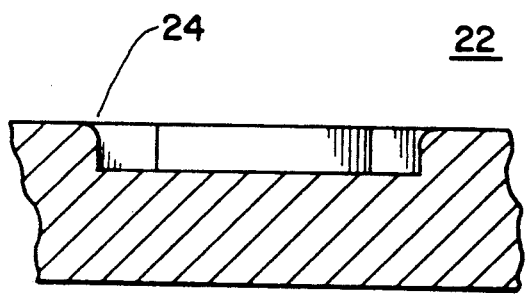
FIG. 4B is a cross sectional elevation of the same depression on the line 4—4 of FIG. 4A.

An alternate shape for the depressions is shown in FIGS. 4A and 4B. The void defined by this depression 22 is here a right section of a polygonal prism. The corners 24 are rounded in this embodiment as they are in the depression 10.

Figure 5:
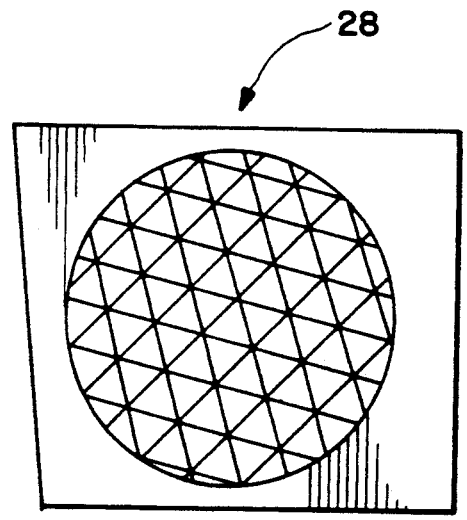
FIG. 5 is plan of a symmetrical depression in the shape of a portion of a geodesic dome.

Another shape is shown in plan view only in FIG. 5. This depression 28 is defined by a void which here resembles a portion of a geodesic dome.

In all three embodiments the extent across is between ten and twenty times the maximum depth of the depression 10. For example, in the cone-shaped depression 10, the depth of the depression 10 (height of the frustum) is 1/10 to 1/20 the diameter. The same ratio holds in the alternate depressions 22, 28, with extent substituted for diameter.

The invention works by inducing small-scale swirling (turbulence) at the surface of the body. This prevents large-scale turbulence which creates friction by dissipating energy.

It is to be understood that the present invention is not limited to the sole embodiment described above, but encompasses any and all embodiments within the scope of the following claims.

I claim:

1. In a body designed for moving through a fluid movement, said body having a maximum width dimension transverse the direction of movement of said body through said fluid medium, said body being covered by a smooth surface, the improvement comprising:
   a plurality of symmetrical depressions in said body surface, said symmetrical depressions being disposed over the entirety of said body surface moving through said fluid medium;
   said symmetrical depressions closely abutting one another, each of said symmetrical depressions having a width dimension and a depth dimension, the depth dimension of each said symmetrical depression being in the range of from one tenth to one twentieth of the width dimension of each said symmetrical depression;
   each said symmetrical depression width dimension being in the range of from one fortieth to one fiftieth of said maximum width dimension of said body transverse the direction of movement of said body through said fluid medium; whereby
   drag of said fluid medium on said body is reduced.

2. A body according to claim 1, wherein
   said symmetrical depressions define voids extending into said smooth surface of said body, said voids having the shape of a frustum of a cone, and
   said symmetrical depressions have rounded corners where said smooth surface meets said symmetrical depressions.

3. A body according to claim 1, wherein
said symmetrical depressions define voids extending into said smooth surface of said body, said voids having the shape of a hexagonal prism, and
said symmetrical depressions have rounded corners where said smooth surface meets said symmetrical depressions.

4. A body according to claim 1, wherein
said symmetrical depressions define voids extending into said smooth surface of said body, said voids having the shape of a portion of a geodesic dome, and
said symmetrical depressions have rounded corners where said smooth surface meets saide symmetrical depressions.

5. An improvement as in claim 1, wherein said body is an airplane, said fluid, medium being air.

6. An improvement as in claim 1, wherein said body is a boat including a beam, said fluid medium is water, and the width dimension transverse the direction of movement of said boat is said beam.

* * * * *